(12) United States Patent
Breton

(10) Patent No.: US 11,987,253 B2
(45) Date of Patent: May 21, 2024

(54) APPARATUS AND METHOD FOR TESTING AUTOMATED VEHICLES

(71) Applicant: HORIBA INSTRUMENTS INCORPORATED, Irvine, CA (US)

(72) Inventor: Leo Alphonse Gerard Breton, Washington, DC (US)

(73) Assignee: HORIBA Instruments Incorporated, Irvine, CA (US)

( * ) Notice: Subject to any disclaimer, the term of this patent is extended or adjusted under 35 U.S.C. 154(b) by 301 days.

(21) Appl. No.: 17/191,068

(22) Filed: Mar. 3, 2021

(65) Prior Publication Data

US 2021/0276571 A1 Sep. 9, 2021

Related U.S. Application Data

(60) Provisional application No. 62/984,683, filed on Mar. 3, 2020.

(51) Int. Cl.
*B60W 40/105* (2012.01)
*B60W 10/06* (2006.01)
(Continued)

(52) U.S. Cl.
CPC .......... *B60W 40/105* (2013.01); *B60W 10/06* (2013.01); *B60W 60/001* (2020.02);
(Continued)

(58) Field of Classification Search
CPC .. B60W 40/105; B60W 60/001; B60W 10/06; B60W 2556/10; B60W 2554/80;
(Continued)

(56) References Cited

U.S. PATENT DOCUMENTS 9,836,895 B1 12/2017 Nygaard et al.
10,031,526 B1 7/2018 Li et al.
(Continued)

FOREIGN PATENT DOCUMENTS

CN 110031238 B 1/2020
DE 102007031040 A1 1/2009
(Continued)

OTHER PUBLICATIONS

International Search Report and Written Opinion of the International Searching Authority dated May 27, 2021 for International Application No. PCT/US2021/020643, filed Mar. 3, 2021, 10 pgs.
(Continued)

*Primary Examiner* — Tyler J Lee
*Assistant Examiner* — Yufeng Zhang
(74) *Attorney, Agent, or Firm* — Brooks Kushman P.C.

(57) ABSTRACT

A processor, responsive to a set of location or motion data describing one or more objects relative to a first, local frame of reference, generates a transformed set of location or motion data describing the one or more objects relative to a second, local frame of reference different than the first local frame of reference, such that the set of location or motion data and the transformed set of location or motion data relative to a global frame of reference are same. The processor also outputs the transformed set of location or motion data to a vehicle such that the vehicle performs control operations responsive thereto.

9 Claims, 6 Drawing Sheets

(51) Int. Cl.
   *B60W 60/00* (2020.01)
   *G01M 17/00* (2006.01)
(52) U.S. Cl.
   CPC .... *G01M 17/00* (2013.01); *B60W 2510/0657* (2013.01); *B60W 2540/18* (2013.01); *B60W 2554/80* (2020.02); *B60W 2556/10* (2020.02)
(58) Field of Classification Search
   CPC ..... B60W 2510/0657; B60W 2540/18; G01M 17/00
   See application file for complete search history.

(56) References Cited

U.S. PATENT DOCUMENTS

| | | | |
|---|---|---|---|
| 10,482,003 | B1 | 11/2019 | Bondor et al. |
| 10,602,376 | B2* | 3/2020 | Vannucci ............. H04W 16/28 |
| 2014/0168243 | A1 | 6/2014 | Huang |
| 2015/0332522 | A1 | 11/2015 | Komada et al. |
| 2017/0103571 | A1 | 4/2017 | Beaurepaire |
| 2018/0267538 | A1 | 9/2018 | Shum et al. |
| 2020/0065443 | A1 | 2/2020 | Liu |
| 2021/0398366 | A1* | 12/2021 | Li ........................ G01S 15/52 |

FOREIGN PATENT DOCUMENTS

| | | |
|---|---|---|
| EP | 3279634 A1 | 2/2018 |
| WO | 2009066083 A1 | 5/2009 |

OTHER PUBLICATIONS

Supplementary European Search Report dated Mar. 7, 2024 for EPSN 21763700, 9 pages.

* cited by examiner

APPARATUS AND METHOD FOR TESTING AUTOMATED VEHICLES

CROSS-REFERENCE TO RELATED APPLICATION

This application claims the benefit of U.S. Provisional Application No. 62/984,683, filed Mar. 3, 2020, the disclosure of which is hereby incorporated in its entirety by reference herein.

TECHNICAL FIELD

The present disclosure relates to the calibration of autonomous vehicle control systems and the measurement of their impact on the energy efficiency of host vehicles, and their impact on the exhaust gas emissions of internal combustion engine vehicles with autonomous vehicle control systems. More specifically, it relates to characterizing the real-world exhaust gas emissions from automobiles with Internal Combustion Engines (ICEs), including Hybrid Electric Vehicles (HEVs), and the real-world energy efficiency and automatic braking responses of any automobile type possessing autonomous longitudinal speed control or braking features, including Battery Electric Vehicles (BEVs), based on laboratory testing.

BACKGROUND

Modern automobiles can operate reliably under almost any combination of environmental, road grade, and driving conditions found on Earth. Such vehicles are common throughout the world and operate regularly and reliably in ambient temperatures ranging from well below 0 C to more than 40 C, from dry desert conditions to humid rainforests, and in bumper-to-bumper, slow city traffic to high speed operation on the German Autobahn.

Many countries that host large numbers of automobiles have exhaust gas emissions or vehicle efficiency standards that automobile manufacturers must comply with. But experience has shown that it is difficult and expensive to test vehicles under the broad range of real-world environmental, road, and driving conditions that are known to affect emissions, fuel economy, or the energy efficiency of vehicles in the real world. And it is well known that the energy efficiency of HEVs and the mileage range of BEVs on a single charge decrease at lower ambient temperatures.

Laboratory-based tailpipe emissions and energy efficiency testing has been historically performed under a limited range of ambient conditions, vehicle speed schedules, and driving conditions. Because the number of vehicles in the world has increased dramatically in recent years, and because vehicles have become increasingly computer-controlled, it has become necessary for governments and automobile manufacturers to better understand the emissions of vehicles across a wider range of operating conditions so National Ambient Air Quality (NAAQ) standards can continue to be met in "attainment areas" and can eventually be met in current "non-attainment areas." It has also become necessary for vehicle manufacturers to be able to assess the effects of potential changes to vehicle emission controls and powertrain calibrations across a wider range of ambient and operating conditions.

The difficulties associated with studying and understanding the "real-world" emissions of vehicles is further complicated in the case of autonomous vehicles and semi-autonomous vehicles, e.g., those with longitudinal speed control or Adaptive Cruise Control (ACC). This is because it has not been known how to operate a vehicle with longitudinal speed control so it autonomously controls its speed in the same way it controls speed in the real world, while a laboratory dynamometer provides realistic real-world loading on the vehicle. Being able to operate a vehicle in the laboratory in this manner would be particularly useful for assessing the impact of a change made to either the longitudinal speed control calibration or to the vehicle's powertrain calibration and is the subject of discussion here.

While laboratory testing methods are known to be very accurate and repeatable for emissions and efficiency measurements under actual test conditions, real-world driving can subject a vehicle to a wide range of conditions that traditional laboratory testing protocols would not. There are many reasons for this, including the difficulty of simulating the full range of real-world temperature and atmospheric pressure conditions in the laboratory, the effects of real-world driver behavior under actual traffic conditions, etc.

It is not currently possible to "blind test" an autonomously controlled vehicle in a laboratory environment for measuring exhaust emissions, fuel economy, or vehicle efficiency while such a vehicle interacts autonomously with other vehicles (blind testing requires that no changes to the subject vehicle are allowed, except for the change being evaluated, and detailed technical knowledge of the vehicle control system is not required). But it is likely that autonomous features affect emissions and energy efficiencies in most vehicles, especially if the vehicle powertrains evolve to employ different calibrations compared with the calibrations that would be employed for a similar real-world drive under conventional driver control.

With the depth of technical knowledge possessed by the developers of the vehicles and autonomous systems, it may be possible to isolate and simulate the effects that other, conflicting vehicles in real-world traffic have on the automated vehicle control systems to obtain some degree of confidence regarding the operation of the system in the real world, but that type of testing does not demonstrate the complete vehicle system behavior the same way in the real world. A complete vehicle system test would offer the highest level of confidence that laboratory results accurately and adequately reflect real-world performance and would be appropriate and suitable for regulators who do not have regular access to detailed technical information regarding a specific make and model of vehicle. And while it is possible that emissions, efficiency, and fuel economy characteristics of a vehicle may be degraded with the employment of automated longitudinal control, it is also possible to employ such systems for their improvement. To accomplish these goals however, a well-controlled, laboratory-based testing apparatus and associated methods are needed to maximize testing precision and representativeness for both automobile manufacturers and regulators.

Traditional laboratory testing for emissions or energy efficiency compliance purposes usually includes measuring exhaust emissions or energy efficiency of the subject vehicle operating on one or more vehicle speed schedules on a dynamometer. Various vehicle speed schedules are intended to represent various types of real-world vehicle operations. For example, the Environmental Protection Agency (EPA) employs different speed schedules for representing city operation, highway operation, and more aggressive vehicle operation. In each case, the vehicle is operated as closely as possible to the corresponding speed schedule by a driver. But newer vehicle models employ autonomous, dynamic, longitudinal speed control as a convenience feature in everincreasing numbers. Because these features are truly convenient by automatically maintaining safe vehicle separation under any operating condition, ranging from bumper-to-bumper city traffic to highway operation, and because the cost of the technology is falling rapidly, autonomous speed control features are likely to be found, and used, on most vehicles in the future. And they are likely to continue to be one of the key technologies of fully-autonomous vehicles of the future.

As the availability and usage of autonomous vehicle speed control continues to grow, however, it is not yet known how to test such vehicles in a laboratory environment, especially within a traditional testing regime based on operation of the subject vehicle on specific vehicle speed schedules using a dynamometer. It is unknown whether or not standard vehicle speed schedules will be used in the future for vehicles that control their own speeds much of the time. For example, the speed schedules may simply be interpreted as the speeds the subject vehicle is forced to follow in response to speeds of leading vehicles traveling at the "speed of traffic" in each case, or alternatively may be interpreted as "the speed of traffic" itself (traffic in which the subject vehicle is embedded and must follow).

SUMMARY

Here, certain embodiments may relate to conducting laboratory testing of autonomous vehicles or vehicles with autonomous longitudinal speed or acceleration control to obtain accurate and repeatable exhaust gas mass emissions measurements in the case of ICE vehicles and energy efficiency measurements and automatic braking actions of any vehicle type—measurements and actions that are representative of the real-world energy efficiency and tailpipe emissions, where applicable, for any longitudinally-controlled vehicle model, on any route, and over any set of ambient conditions of interest. These embodiments provide apparatuses and methods to allow the emissions and energy efficiency impacts, and the automatic or emergency braking actions of autonomous longitudinal control vehicle functions to be accurately determined. Furthermore, by simulating or replicating real-world traffic events in a controlled environment, emissions, energy efficiency, and safety system performance can be calibrated, evaluated, and improved.

More specifically, certain embodiments relate to an apparatus for simulating other vehicle traffic and roadside objects by the creation of appropriate vehicle data bus signals representing the presence of such traffic and objects, intercepting and removing actual data bus signals representing a view of objects based on the vehicle's sensors, and "injecting" or substituting the created signals onto the data bus in place of the original signals. While the created signals do not necessarily need to have a real-world basis or origin, for some purposes it is advantageous for the created signals to be derived from real-world data bus signals obtained by recording the signals during a prior road drive to be simulated in the laboratory.

In the latter case, a vehicle with longitudinal speed control is operated along a desired route in the real world while vehicle speed and the relative locations or motions of objects detected by the speed control sensors are recorded from the vehicle data bus. The vehicle or powertrain is then brought into the laboratory or onto a designated testing route or track, and operated with longitudinal speed control engaged. If the test is being conducted in a laboratory, the vehicle will be operated in conjunction with a dynamometer. In all cases, the vehicle data bus signals containing object detections or motions are removed and replaced with "transformed" data bus signals based on the difference between the real-world vehicle speed and the simulated vehicle speed histories. The "transformed" signals represent the relative locations and motions the same objects would have been found to possess if the real-world speed had been the same as the simulated, or speed during the test. In this way, vehicles with longitudinal speed control and powertrain calibration changes from one test to the next, which inevitably affects the speed of the vehicle, can be retested and compared directly, without having to re-create the exact same traffic scenario and without returning to the real world for each test.

An apparatus for transforming the relative locations and motions of previously detected objects, based on vehicle speed sensor or dynamometer feedback, intercepting and removing related data bus signals from a vehicle, and substituting the transformed data bus signals in their place is disclosed.

A method for transforming the locations or motions of a set of detected objects from one reference frame, for example the real-world, to another reference frame, e.g., a laboratory dynamometer or test track simulation is also disclosed. The objects may be stationary, dynamic, or a combination of both.

A testing method for testing a vehicle with automated longitudinal speed control, in conjunction with a laboratory dynamometer or road or test track, and based on transformed or simulated object locations or motions based on speed feedback from the vehicle or dynamometer is also disclosed.

If either portable emissions measurement system (PEMS) emissions data or energy consumption was optionally collected for those testing methods that include real-world driving, the PEMS data can then be directly compared with the corresponding emissions or energy efficiency data collected during the laboratory or other testing simulation conducted with the same conditions, to ensure agreement within an acceptable range. This optional "validation" process serves to document a high degree of confidence that both the laboratory or simulation test and the real-world measurements are both correct and reproducible.

BRIEF DESCRIPTION OF THE DRAWINGS

FIG. 5 is a Field of View depiction of the substituted transformed relative object locations and motions during laboratory testing, compared with the real-world relative object locations they are derived from.

DETAILED DESCRIPTION

Various embodiments of the present invention are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
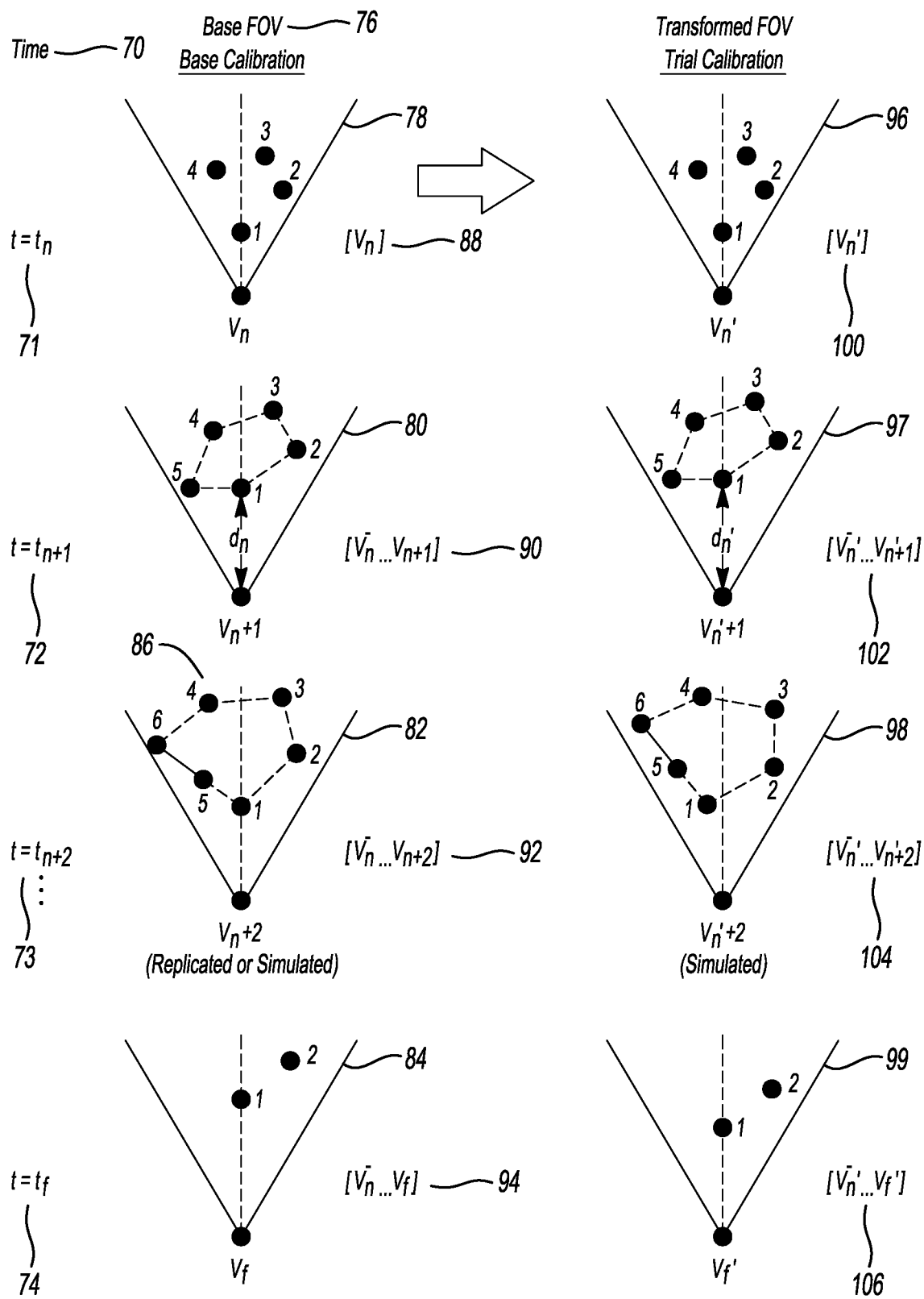
FIG. 1 is a depiction of a Field of View schedule of the relative real-world object detection locations, recorded from a prior real-world drive of a vehicle, or created as a simulated scenario for testing.

FIG. 1 is a depiction of a Field of View (FOV) time schedule of the relative locations of a set of real-world objects detected by the longitudinal speed control sensors, and either recorded from a prior real-world vehicle test, or created as a simulated scenario for testing such a vehicle in a laboratory. The time column 70 shows three consecutive test time steps, $t=t_n$ 71, $t=t_{n+1}$ 72, $t=t_{n+2}$ 73, and a final time step $t=t_f$ 74, for illustrative purposes.

The Base FOV column 76 shows exemplary FOV plots showing the set of objects 78, 80, 82, 84 either detected by the longitudinal speed control system of the vehicle, or being simulated as such, at their associated time steps $t=t_n$ 71, $t=t_{n+1}$ 72, $t=t_{n+2}$ 73, and $t=t_f$ 74, respectively. The objects in each FOV plot have been numbered for reference, e.g., at time step $t=t_{n+2}$ 73, the corresponding FOV plot 82 shows a set of 6 detected objects 86 located in front of the vehicle.

Furthermore, associated with each test time step 71, 72, 73, 74, and each associated FOV plot 78, 80, 82, 84, is a vehicle speed array 88, 90, 92, 94, respectively, comprising the entire vehicle speed histories associated with the test times, up to the test time being considered. For example, at time step $t=t_{n+2}$ 73, with corresponding $t=t_{n+2}$ FOV plot 82, showing the set of 6 detected objects 86 located in front of the vehicle, the figure shows an associated vehicle speed array $[v_n \ldots v_{n+2}]$ 92 comprising a complete set or schedule of vehicle speeds associated with those times.

For exemplary purposes, the $t=t_n$ FOV plot 78 shows four objects detected by the vehicle longitudinal speed control system, enumerated 1-4 as shown. In subsequent, sequential time steps, showing the $t=t_{n+1}$ FOV plot 80 and the $t=t_{n+2}$ FOV plot 82, 5 objects, and 6 objects were detected, respectively, and numerated 1-5 and 1-6, also shown. Because the time steps are sequential, and assuming they are closely spaced in time, because of the almost static relative locations of objects 1-4 to each other and to the vehicle, objects 1-4 are likely the same objects in all three FOVs, while objects 5 and 6 are likely newly detected objects at time steps $t=t_{n+1}$ and $t=t_{n+2}$, respectively. Objects 1-2 shown in the $t=t_f$ FOV 84 may be different objects altogether if a significant amount of time elapses during the test, especially if the vehicle exhibits roadway lane changes.

The time step progression and associated FOVs and vehicle speed arrays depicted in FIG. 1 are representative of FOV and speed data that may have been recorded during a real world road drive from a test vehicle with longitudinal speed control active and, at times, following behind a "leading vehicle" limiting the speed of the "following" test vehicle. The driver-controlled settings of the longitudinal speed control system may have included a speed setpoint and a choice of different following distance settings or calibrations, as commonly found in modern vehicles. And the longitudinal speed control system may have been operating in conjunction with a "base calibration" or another preset calibration, which a driver cannot change under normal circumstances.

If a driver were to change the following distance setting on a production vehicle, or if a vehicle manufacturer were to change either the longitudinal speed control system calibration or the powertrain calibration during the vehicle development process, the result would likely be some change in the performance or responsiveness of the test vehicle in achieving and maintaining a setpoint speed or in how "aggressively" or precisely the vehicle attempts to maintain a specific following distance, as a function of vehicle speed, behind an arbitrary leading vehicle that it encounters during a road drive. For example, a vehicle manufacturer may want a less aggressive response to a change in the speed of a leading vehicle, or to a change in road grade experienced by the test vehicle, for improved fuel economy (in the case of an internal combustion engine powertrain) or energy efficiency (in the case of a BEV). Therefore, it is advantageous for a vehicle manufacturer to be able to evaluate "trial calibrations" for both the powertrain and longitudinal speed control system by performing laboratory testing to determine the effects of the changed calibrations on exhaust emissions and fuel economy of ICE equipped vehicles, and the effects on the energy efficiency of BEVs.

For a fixed set of real-world traffic conditions and roadside object locations over time, marginally different vehicle powertrain or longitudinal speed control system calibrations (i.e., employing a "trial calibration"), as described above, would result in real world drive time step recordings of associated FOVs and vehicle speed arrays that are different compared with those associated with the "base calibration" for all time steps after the first time step $t_n$ 71. FIG. 1 shows an example of this behavior. At the initial time step $t_n$, prior to any differences in motion exhibited by the vehicle with different calibrations, the associated base calibration FOV 78 and trial calibration FOV 96 are the same, and the vehicle speed array $[v_n]$ 78 and $[v'_n]$ 100 are the same, as shown. But they differ in subsequent time steps. For example, if $v_{n+1} > v'_{n+1}$, and $v_{n+1} >\sim v'_{n+1}$, then the time step $t_{n+1}$ base FOV 80 would likely show the same objects as the trial calibration FOV 97, but they would appear as viewed from a slightly closer vantage point, as shown. Similar reasoning explains the differences between subsequent time step FOVs, as shown in the figure.

Calculating the differences between a time-coordinated base calibration vehicle speed history $[v_n \ldots v_f]$ 94 and a trial calibration vehicle speed history $[v'_n \ldots v'_f]$ 99, allows the trial calibration FOVs 96, 97, 98, 99 to be derived by a simple geometric transformation of the recorded base calibration FOVs 78, 80, 82, 84. For travel along the same 1-dimensional pathway, the difference between the actual location d associated with a speed history array $[v_1 \ldots v_n]$, at any instant of time $t_n$, and a simulated location d' associated with a speed history array $[v'_1 \ldots v'_n]$ is given, for small time steps, by the following equation:

$$d-d'=[v_1 \ldots v_n]\text{dot}\{[t_1 \ldots -t_n]-[t_0 \ldots -t_{n-1}]\}$$

This value represents the small change in location of the simulated vehicle relative to the real or simulated test vehicle (base vehicle) used to create the database of relative object locations and motions during, for example, a real-world drive with ACC system objects detection logging, or simulated object locations and motions created virtually. This difference in the location of the simulated vehicle relative to the base vehicle is the reason why the object locations must be transformed for any given time step. The transformation process will be described below in detail.

Figure 2:
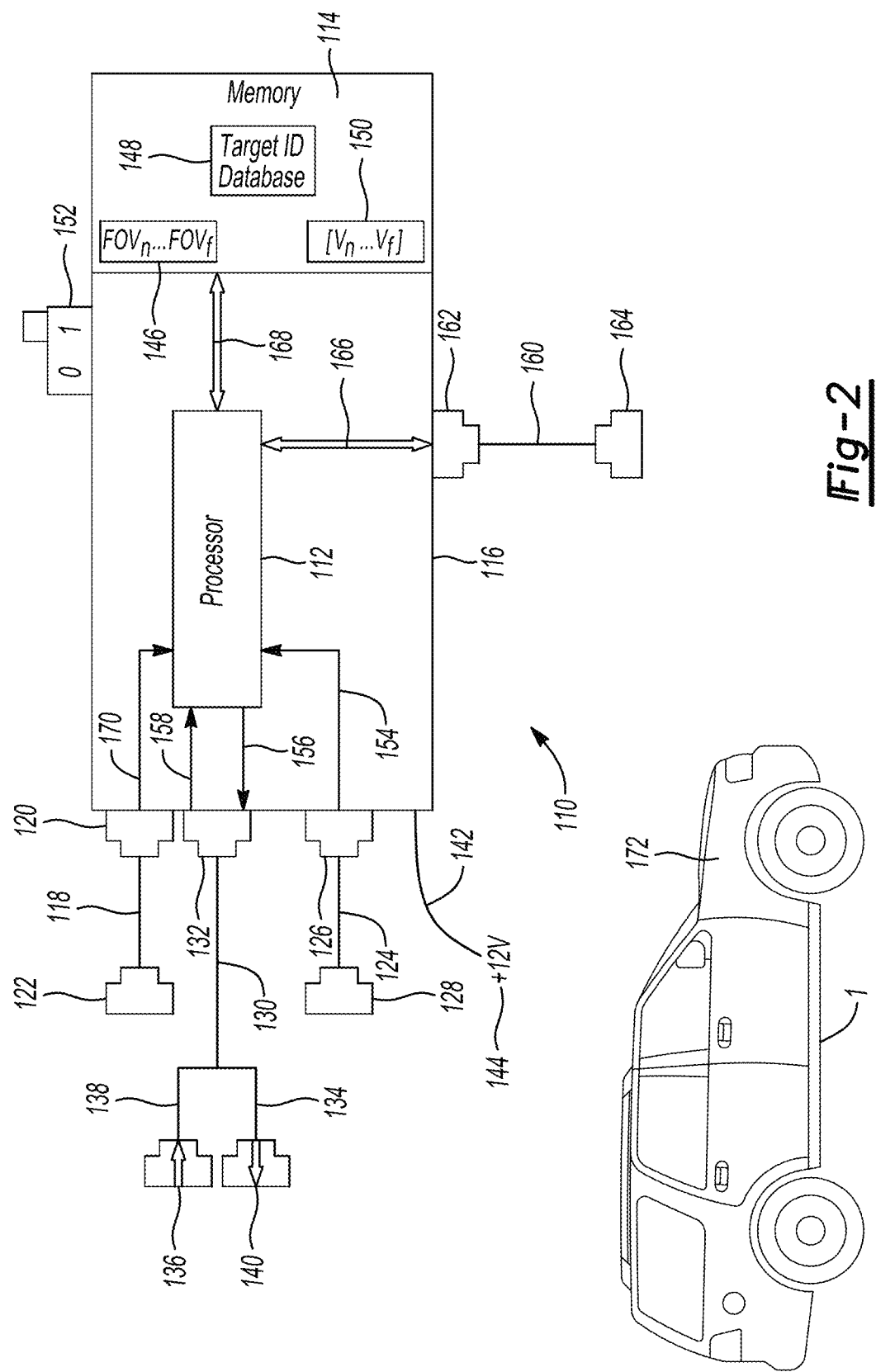
FIG. 2 shows an apparatus for recording, storing, transforming, and transmitting real-world drive data for testing a vehicle.

FIG. 2 shows an FOV simulation apparatus 110 for use in evaluating the emissions and fuel economy or energy efficiency impacts of trial powertrain and longitudinal speed control system calibrations of vehicles, compared with base calibrations, and in conjunction with a chassis, engine, or powertrain dynamometer for simulating real-world load on the vehicle powertrain.

The FOV simulation apparatus, or FOV simulator 110 is comprised of an enclosure 116, a processor 112, memory storage 114, a switch 152 for selecting the mode of operation, a 12 volt power source 144, and various external data cables for receiving data from vehicle data buses, sending data to a vehicle data bus associated with the vehicle longitudinal speed control system, or for communicating and transferring data with a computer. The function of individual components will be described in greater detail below.

The memory module 114 comprises target ID database memory 148 for storing vehicle longitudinal speed control system target object identification bus message identifiers and associated message structures, FOV frames memory 146 for storing acquired or simulated time or location based vehicle longitudinal speed control system sets of detected objects, and vehicle speed history memory 150 for storing acquired or simulated vehicle speeds correlated with the FOV frames stored in the FOV frames memory 146.

The vehicle longitudinal speed control bus (VLSCB) cable 130 connects the FOV simulator 110 with a vehicle longitudinal speed control system bus that provides detected object information, using a VLSCB cable to FOV simulator connector 132 on one end, and a VLSCB cable to object output data bus connector 136 on the opposite end. Also, on the opposite end of the VLSCB cable is a VLSCB cable to object input data bus connector 140. Vehicle speed data messages are carried from a vehicle data bus to the FOV simulator 110 by the speed data bus cable 118, connected from the vehicle with the vehicle speed bus connector 122 and the vehicle speed FOV simulator connector 120 on the opposite end.

When a vehicle being tested is operating in conjunction with a dynamometer, the dynamometer controller speed signal cable 124 may be optionally used to carry the speed information from the dynamometer to the FOV simulator. Or the dynamometer controller speed signal cable 124 is connected to the dynamometer controller (not shown) using the dynamometer controller connector 128 and the FOV simulator dynamometer speed connector 126. This allows the user to choose which speed signal to use.

A power supply 144 provides 12 VDC electrical power to the FOV simulator 110 on a power input line 142 so it can function as a standalone device and a computer interface cable 160 is used to communicate with an external computer (not shown) by connecting the computer with the computer interface connector 164 and the FOV simulator computer connector 162. Exemplary usage of the FOV simulator apparatus will now be described.

A vehicle equipped with longitudinal speed control 172 to be emissions, fuel economy, or energy efficiency tested (e.g., a BEV) or calibrated is first identified. The FOV simulator is connected to a host computer and a complete set of vehicle-specific target object identification message identifiers and formats used by the vehicle 1 type is uploaded to the FOV simulator 110 and stored in the target ID database 148 by the processor 112. Vehicle-specific vehicle speed identification message identifiers and formats used by the vehicle 1 are uploaded to the FOV simulator 110 and stored in the target ID database 148 in a similar manner. The connection to the external computer is made using the computer interface cable 160, comprising the FOV simulator computer connector 162 on one end, and the computer interface connector 164 on the opposite end. If virtual traffic or simulated driving scenarios are to be used, in lieu of real-world recorded scenarios, simulated FOV object detection frames and their corresponding vehicle speed and associated time stamps are uploaded to the FOV frames memory 146 and vehicle speed history memory 150, respectively.

Using real-world object detection scenarios and traffic conditions can be advantageous because, by definition, they are realistic and meaningful. And use cases or "worst-case" scenarios can be based on real-world operation. In this case, the switch 152 is set to the off or "0" position causing the FOV simulator 110 to record all FOV object detection frames and vehicle speed frames from the vehicle 1, as defined by the target ID database 148. The recorded FOV frames data and the vehicle speed history data and associated time stamps are identified and stored in the FOV frames memory 146 and the vehicle speed history memory 150, respectively by the processor 112.

Figure 3:
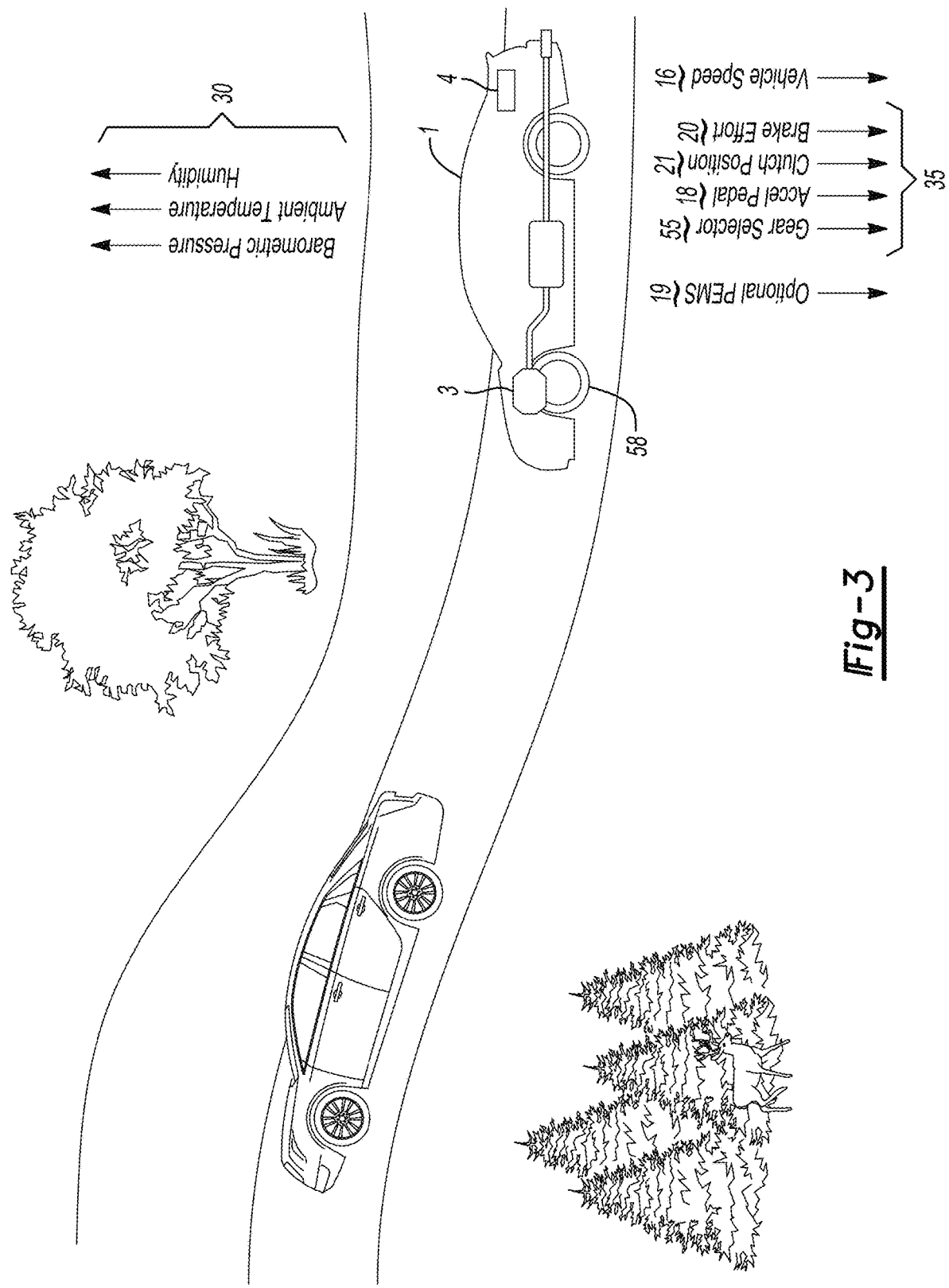
FIG. 3 shows a vehicle with longitudinal speed control operating on a road in the real-world. During operation, data bus signals for vehicle speed and object detections from the longitudinal speed control sensors are recorded. Weather information is also recorded by an onboard weather station.

Referring to FIG. 3, a vehicle 1 may be driven in the real world on any route of interest, while conducting any real-world traffic or object scenarios desired, based on the purpose of the testing. Vehicle emissions and fuel economy data, or energy efficiency data may also be optionally acquired and stored, e.g., using a PEMS 4 in the case of emissions and fuel economy of an ICE or hybrid electric vehicle, or an electrical power usage meter (not shown) in the case of the energy efficiency of BEVs. Continuous measurement and recording of PEMS weather station data 30 including atmospheric pressure, ambient air temperature and humidity or using another weather station (not shown) is advantageous data to collect during the drive for accurately replicating and simulating the drive in a laboratory.

Referring back to FIG. 2, during the entire real-world drive, FOV object detection frame messages are identified, e.g., by the processor 112, by comparing input messages received on the VLSCB cable 130 to the stored target ID database 148, and all are stored in the FOV frames memory 146. Likewise, vehicle speed messages, e.g., those received on the speed data bus cable 118, are identified by comparing them to the stored vehicle speed message format that is stored in the vehicle speed history memory 150 with associated times. With respect to the apparatus described above, this can be accomplished by setting the switch 152 in the "0" position and connecting the vehicle longitudinal speed control bus input data line 170 to the vehicle longitudinal speed control bus output data line 156. If the object input data bus connector 140 is connected to the vehicle 1 as described above, it carries all of the data messages from the object output data bus connector 136. Alternatively, the object input data bus connector 140 can remain disconnected from the vehicle 1 if the VLSCB cable 130 had not been spliced during installation.

Whether the FOV frames memory 146 and the vehicle speed history memory 150 were populated with simulation scenario data using a separate computer, or data acquired from real world driving, i.e., following either of the two options described above, the FOV simulator 110 would then contain a baseline set of data for the real world drive or traffic scenarios of interest in the memory storage 114.

If the FOV simulator 110 had been used to record a baseline set of data during a prior real world drive, the FOV simulator 110 can be subsequently used to feed the same data back to the vehicle 1, in conjunction with dynamometer loading and simulated atmospheric conditions, based on the real-world atmospheric conditions previously recorded with a weather station. By doing this, the prior real-world control of the powertrain during the real-world drive is replicated in the laboratory. Alternatively, control of the powertrain during a simulated drive or simulated driving scenarios or maneuvers can be caused in the laboratory (or on a track).

Figure 4:
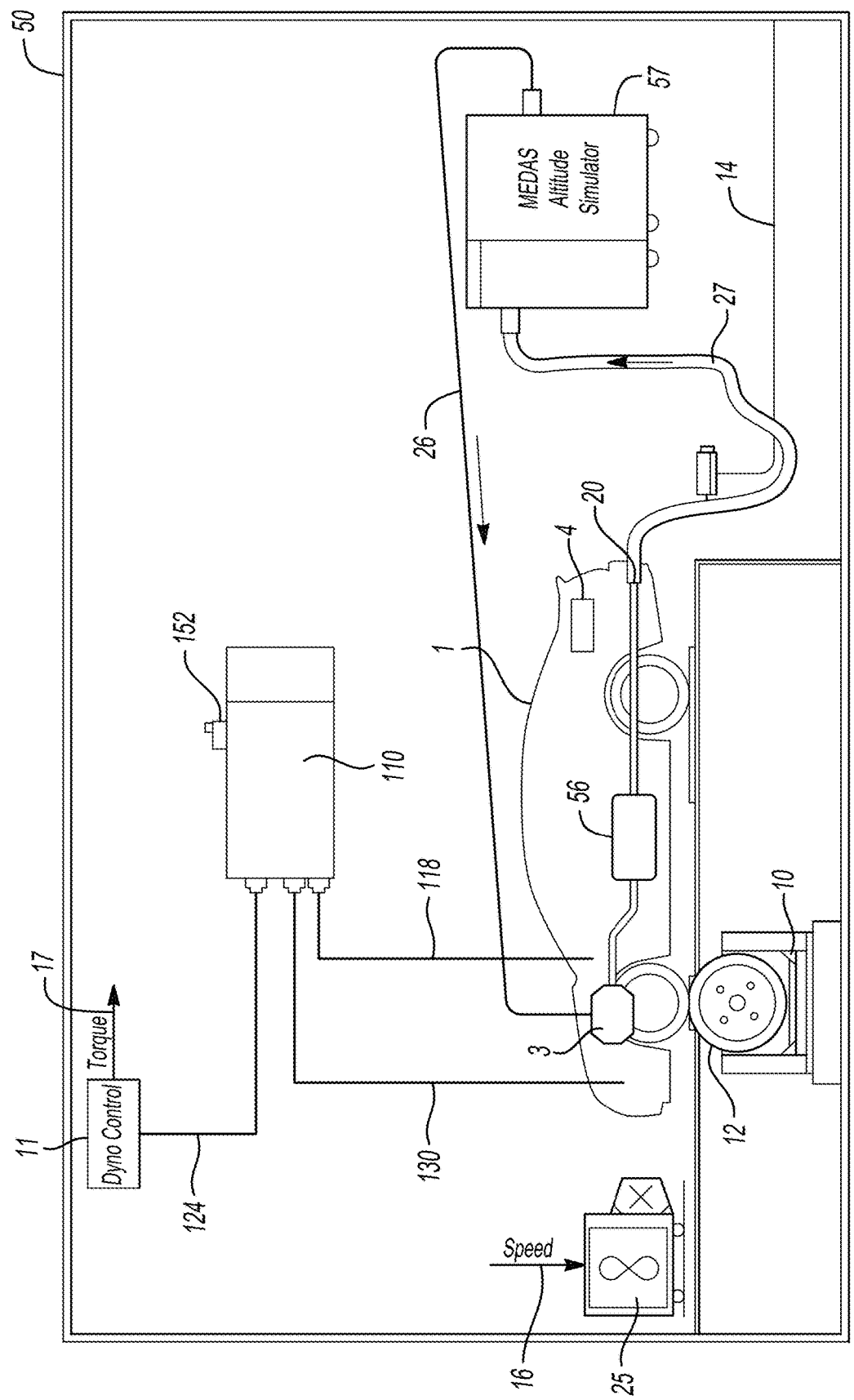
FIG. 4 shows a vehicle being tested in a laboratory while the vehicle load and weather conditions are simulated. The apparatus for substituting "transformed" relative object location signals onto the vehicle data bus in place of the original signals is also shown.

Referring to FIGS. 2 and 4, the vehicle 1 or powertrain to be tested or calibrated is mated to a dynamometer in a normal testing manner, or may alternatively be tested on an isolated road or test track. For the case of a chassis dynamometer 10 with chassis rolls 12, proper loading using the dynamometer is achieved in a manner consistent with known dynamometer loading methods known in the art of engine, powertrain, and chassis dynamometer testing. If it is desirable to replicate real-world atmospheric conditions, the road load applied by the dynamometer can be adjusted, as known in the art, to correct for differences in aerodynamic drag because of any differences in atmospheric pressure, temperature, and humidity between the real-world, measured values, and the atmospheric conditions available for testing within a test cell 50. In the case of a vehicle with an ICE, an altitude/temperature/humidity simulator 57 can be used to cause the powertrain to operate as it did, or as it would in the real-world. A capital-intensive alternative is to simulate atmospheric conditions for an entire vehicle or powertrain using a test cell 50 enclosed in an environmentally-controlled chamber (not shown).

A dynamometer speed signal, e.g., a rolls speed or an equivalent vehicle speed signal is input to the FOV simulator 110 from the dynamometer controller 11 by connecting the FOV simulator 110 to the dynamometer controller using the speed signal cable 124. The vehicle data bus carrying the individual sensor, or sensor-fused FOV objects identified by the vehicle longitudinal speed control system, is located (not shown). The VLSCB cable 130 is connected to the FOV simulator 110 on one end and is spliced into the vehicle longitudinal speed control system bus that provides detected object information by splicing or connecting the bi-directional VLSCB cable 130 into the bus using the VLSCB cable to object output data bus connector 136 on the data source side of the spliced bus, and VLSCB cable to object input data bus connector 140 on the data use side of the spliced bus. In this way, sensor-based FOV data generated in the static testing environment can be intercepted by the FOV simulator 110 and replaced with transformed FOV data by the FOV simulator 110, based on the differences between the histories of the dynamometer controller speed signals and the vehicle speed history memory 150 previously populated with real-world or simulated scenario data. The vehicle data bus carrying the vehicle speed messages (not shown) is located and connected to the FOV simulator 110 using the speed data bus cable 118 using the vehicle speed bus connector 122, and the FOV simulator 110 is powered by connecting it to a 12 VDC voltage source from the vehicle or an independent power supply.

Prior to initiating the dynamometer testing, the switch 152 is set to the "on" or "1" position, causing the FOV simulator 110 to replace all FOV object detection frames input from the vehicle 1 to the FOV simulator 110, as defined by the target ID database 148, with similar messages, wherein the relative locations of objects have been transformed by the processor 112 (FIG. 2) based on the differences in vehicle speed histories contained in the set of speed data frames input on speed data bus cable 118 and their correlated time stamps. The net result is that instead of the vehicle powertrain controller controlling the powertrain based on the vehicle longitudinal speed control system sensor FOVs or fused FOVs, and based on the actual atmospheric conditions in the test cell during testing, the powertrain controller controls is caused to control the powertrain based on previously recorded or created real-world FOVs, or simulated FOVs, respectively, as well as based on simulated atmospheric conditions that equal the previously recorded, real-world atmospheric conditions, or that simulate different, desired ambient testing conditions.

If the goal of the laboratory or track testing is to replicate a prior on-road drive, or evaluate calibration changes to the powertrain or longitudinal speed control system, compared with the calibration used during a prior on-road drive, the driver-controlled settings of the longitudinal speed control system are matched to the real-world drive settings. Otherwise, other test values, depending on the purpose of the laboratory or track test testing are used. In the former case, the speed-controlled fan 25, atmospheric simulator 57, or climate-controlled chamber enclosing the test cell, and dynamometer controller are all set to the conditions corresponding to the start of test, with respect to the time-stamped data in the FOV simulator memory module 114. Start switch (not shown) is pressed to initiate the testing sequence. Once depressed, the FOV and vehicle speed data are retrieved by the processor 112 from the memory module 114 in order of their associated time stamps. All incoming FOV frames received by the FOV simulator 116 on the VLSCB cable 130 are identified by the processor 112, with reference to the target ID database memory 148. All other messages are immediately rebroadcast by the FOV simulator onto VLSCB output cable 134.

The FOV frames are not simply rebroadcast verbatim. In order, and synchronized according to their timestamps, the FOV frames retrieved from the memory module 114 are transformed to account for the location differences (d-d') between the base vehicle and the simulated vehicle, as time progresses. Once again, these location differences are due to the accumulated effect of all of the instantaneous vehicle speed differences up to the current test time. They are calculated, as shown above, by considering the time corresponding base speed histories stored in the vehicle speed history memory 150 and the simulated speed histories input on the speed signal cable 124 or vehicle data bus cable 118. More specifically, the relative geometric locations of the detected objects contained in the stored FOV frames are transformed to account for the difference in the location along the test route. Substitute data frames are then broadcast onto the FOV simulator VLSCB output cable 130, and to the vehicle 172, thereby replacing the original data frames from the vehicle 172, via the input cable 138, during the simulation.

Figure 5:
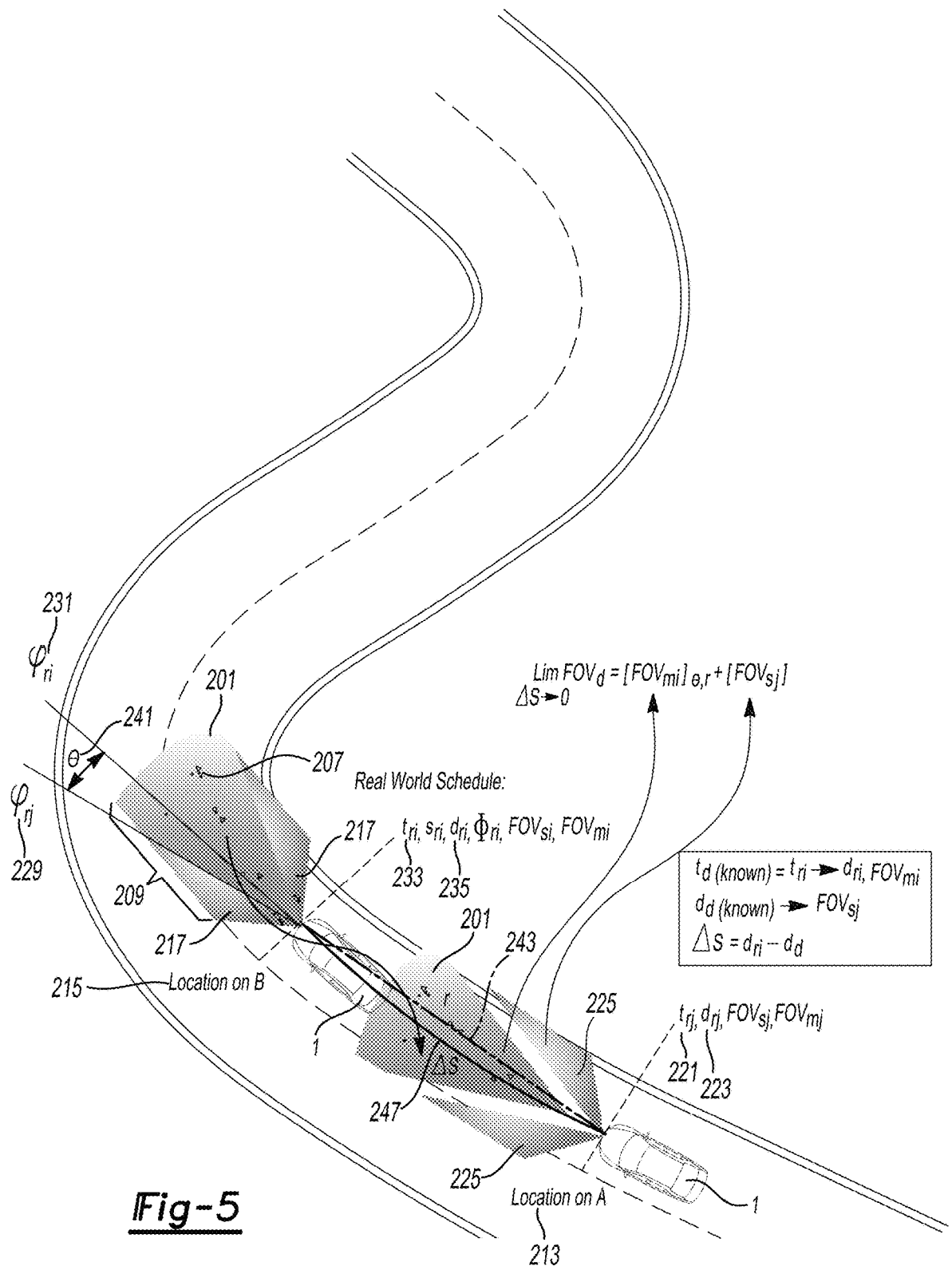
Figure 6:
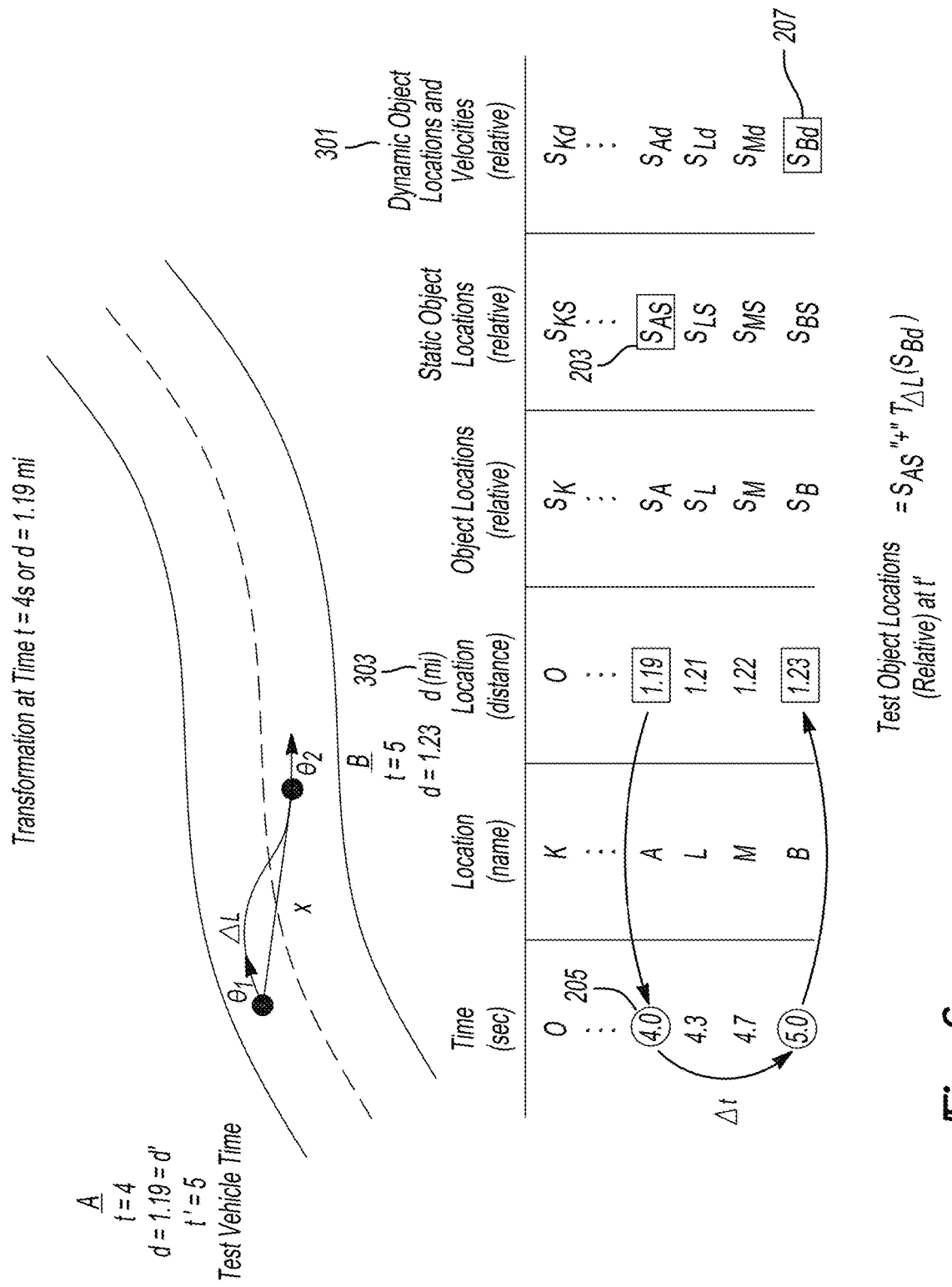
FIG. 6 shows the process for combining static object database location data at a simulated vehicle location with the transformed dynamic object or target database data as it would be seen from the same simulated vehicle location.

The transformation of the logged (recorded) data from the base vehicle real-world or simulated drive, as described above, is shown visually in more detail in FIG. 5 and methodically in FIG. 6.

For the important case of an autonomous vehicle embedded in controlling traffic, i.e., the case in which the autonomous control system is actively limiting the speed of the vehicle 1 due to the presence of other vehicles ahead of it and in its expected path, FIG. 5 shows the general method for transforming the locations of a set of objects and/or targets identified and recorded by the autonomous vehicle control system during a real-world drive or created for a simulation. For illustrative purposes, consider such a set of objects and/or targets represented by the general set of object symbols 207 comprising the output objects at an instant of time from the autonomous vehicle control system individual sensors or from a sensor-fused Birds Eye FOV, e.g., Birds Eye FOV, $FOV_B$ 209, when at Location B 215 shown. For simplicity of drawing, assume $FOV_B$ 209 comprises an inner moving target FOV 201, e.g., showing locations and velocities of other nearby vehicles, and an outer object FOV 217, e.g., showing locations of static objects including, but not limited to road signs and guard rails. In this simplified case, it is straightforward to illustrate the general transformation method graphically, and as shown.

FIG. 5 depicts two illustrative vehicle locations, Location A 213 and Location B 215, traversed in a prior real-world drive, or in a virtual or simulated drive. During the prior real-world or simulated road drive, the vehicle 1 was first located at location A 213, associated with Birds Eye $FOV_A$, (not shown in its entirety), before arriving at Location B 215 associated with Birds Eye $FOV_B$ 209. The real-world recorded or simulated parameters associated with each location are defined below.

Location A 213:
Birds Eye $FOV_A$ (not shown it its entirety) comprises static object $FOV_{sj}$ 225 and mobile object $FOV_{mj}$ (not shown), i.e., the relative locations and velocities of the combined static and dynamic objects;
$t_{rj}$ 221 is the time the vehicle 1 arrives at Location A 213;
$d_{rj}$ 223 is the cumulative distance driven en route to Location A 213; and
$\varphi_{rj}$ 229 is the heading of the vehicle at Location A 213.

Location B 215:
Birds Eye $FOV_B$ 209 comprises static object $FOV_{sj}$ 217 and mobile object $FOV_{mj}$ 201, i.e., the relative locations and velocities of the combined static and dynamic objects;
$t_{ri}$ 233 is the time the vehicle 1 arrives at Location B 215;
$d_{ri}$ 235 is the cumulative distance driven en route to Location B 215; and
$\varphi_{ri}$ 231 is the heading of the vehicle at Location B 215.
Calculated and defined variables associated with the difference in locations of Location A 213 vs. Location B 215, and denoted AvB are defined below.

AvB:
Heading difference θ 241 is given by θ=φri−φrj;
Straight-line between Location A 213 to Location B 215 is defined as r 243; and
Actual route path between Location A 213 and Location B 215 is defined as ΔS 247.

Once the real-world drive is complete, or the real-world simulation is complete, the above real world recorded or simulation parameters comprise a database 301 (FIG. 6) of all objects and targets, and their velocities or motions detected by the vehicle 1 autonomous control system for the entire real world drive or simulation. While each of the database 301 objects, whether static or dynamic, were detected with reference to a local frame of reference, each object was actually located at some position relative to a global coordinate system as well, which is easily calculated by one of ordinary skill in this field. Whether the objects and their motions are viewed from the location and heading of the vehicle 1 when they were sensed, or from a different or hypothetical vehicle 1 location, their locations and changes in locations in time must be the same in any global frame of reference. This fact can be used to great advantage for testing any vehicle with an autonomous or adaptive cruise control system, especially for evaluating changes to either the calibration of the autonomous control system, or to the powertrain of the same vehicle 1 which was used to create the database 301, or other small changes made to either system. This is because small changes to the overall performance of the vehicle 1, e.g., calibration changes, typically result in relatively small performance changes and commensurately small changes in the global location of a vehicle over time for the case in which the vehicle 1 is always controlled by the same combination of leading vehicle locations and velocities and/or driver-selectable maximum speed settings.

The locations and velocities or motions of the set of recorded objects sensed or viewed by the vehicle 1 autonomous system during a real-world or simulated road drive, and with reference to a local reference frame, can be transformed to a different view of the same set of objects from a different global location and coordinate system orientation by one of ordinary skill in the art. For example, the locations and motions of recorded objects sensed by the vehicle 1 autonomous control system at Location B 215, operating under a first autonomous control system or powertrain calibration, can be easily transformed to a view that the same vehicle 1 autonomous control system would have, if operating under a second autonomous control system or powertrain calibration differing from the first, and thereby resulting in the vehicle 1 location to be Location A at the corresponding or equal test time over the same route, due to performance differences.

The transformation described above can be written symbolically as the following:

$$\lim_{\Delta S \to 0} FOVd = [FOVmi]\theta, r + [FOVsj]$$

and meaning that small changes in the location of an autonomously controlled vehicle 1 limited by leading vehicles in its expected path, e.g., location changes due to calibration changes to either the autonomous control system or the powertrain, and operating under the same driver-controlled autonomous control settings, the field of view FOVd comprising the autonomous system sensors or the sensor-fused field of view at the actual location of the vehicle 1 along the same route or same simulated route, can be constructed by transforming the field of view of the mobile objects from the original real-world drive or simulation at the same test time, to the less-advanced, actual location to account for the differences in vehicle 1 heading and location.

FIG. 6 illustrates a specific example of the above transformation process performed by the processor 112 of the FOV simulator 110 while the autonomous or adaptive cruise control equipped vehicle 1 operates with a trial or test calibration and in conjunction with a laboratory chassis, powertrain, or engine dynamometer as descried above. The database 301 comprises all of the autonomous vehicle control system sensor data or fused sensor data collected during a real-world drive by the FOV simulator 110 while the switch 152 is in "record" mode, i.e., position "0", or any other device used to collect similar data, or data created for a simulated drive as described above. With the FOV simulator 110 switched to the "1" position, the transformations are done based on the difference between the actual location of the vehicle as represented in one dimension by the dynamometer distance driven d 303, based on dynamometer or vehicle speed feedback as described above, and in the following manner.

For the trial calibration test case at an arbitrary dynamometer distance driven d 303 of 1.19 miles, the set of corresponding static object locations $S_{AS}$ 203 is chosen. While the vehicle 1 reached this location with the base calibration at t=4 seconds 205, the vehicle 1 reached this same location with a trial calibration at t'=5 seconds. Referring to the database 301, the location corresponding to a base calibration test time t of the same value, i.e., t=t'=5 seconds, is d=1.23 miles with a corresponding set of dynamic object locations and velocities identified as $S_{Bd}$ 207. $S_{Bd}$ 207 is then transformed in the manner described above, and combined with $S_{AS}$ 203 to form a complete set of objects and targets for presentation to the autonomous vehicle control system using the data intercept method described above, i.e., the sensor-based FOV data generated in the static, laboratory testing environment is intercepted by the FOV simulator 110 and replaced with the transformed FOV data by the FOV simulator 110.

It is well known to one of ordinary skill in the art that driving style affects the energy efficiency of all types of automobile powertrains and the exhaust emissions levels of powertrains employing Internal Combustion Engines (ICEs). Accelerator pedal movements, braking activities, and powertrain calibrations all impact the efficiencies and emissions of vehicles. But autonomous longitudinal speed control features on vehicles, e.g., Adaptive Cruise Control (ACC), supplant normal accelerator pedal inputs and braking activities of the driver and may depend upon a different set of powertrain calibrations while the vehicle is operating autonomously.

The testing laboratory may be contained in a climatically controlled chamber (not shown) for which ambient air conditions of pressure, temperature, and humidity can be individually controlled. Such a laboratory allows for replication or simulation of ambient air conditions to reflect prior real-world driving conditions to be replicated or simulated in the laboratory, or the simulation of specific ambient air conditions of interest, for maximum accuracy of test results and between tests intending to be identical except for a controlled variable.

Alternatively, a more cost-effective implementation for replicating and simulating dynamic ambient air conditions employs an "environmental conditions simulator" 52, recently made available commercially. It provides a less capital intensive means for dynamically changing ambient conditions experienced by a powertrain during testing and for replicating and simulating desired ambient air conditions, while allowing the use, or continued use, of a standard emissions test laboratory. In this case, the ambient air pressure, temperature, and humidity conditions are created by the environmental conditions simulator 52 and applied only to the powertrain and necessary vehicle sensors by connecting the environmental conditions simulator 52 to the subject vehicle 6 engine intake air system, (not shown) by the intake air hose 56 and to the vehicle's tailpipe 24 by the exhaust gas hose 54. The environmental conditions simulator 52 controls the intake air pressure, exhaust backpressure, and intake air humidity to either fixed, selected values, or to programmatically controlled, dynamic values as desired, or to mimic the conditions recorded during a real-world test, properly synchronized with the subject vehicle 6 speed on the dynamometer assembly 12.

Any of the exemplary test methods shown can optionally employ an ambient atmospheric conditions simulator or, alternatively, a whole-vehicle "environmental testing chamber" for conducting accurate testing when the desired weather conditions differ from the laboratory ambient conditions that happen to be available.

Prior to operating the vehicle on the dynamometer, the appropriate, road load parameters for the test vehicle, the appropriate road grade parameters for the route, and the dynamic environmental conditions are selected or programmed into the environmental control system, i.e., into the control system for the associated environmental chamber or powertrain "environmental conditions simulator." In cases where the laboratory environmental conditions differ significantly from the desired environmental conditions, e.g., when simulating a real-world road drive in controlling traffic at different weather conditions, maintaining the appropriate environmental conditions is important for causing the powertrain to operate in the appropriate calibration space, thereby generating representative emissions and exhibiting a representative energy efficiency.

The above contemplated transformed data may be used by a vehicle to perform various control operations such as braking, steering, acceleration, etc. so as to navigate a road (real or simulated) while at the same time avoiding contact with other objects (real or simulated) If, for example, the transformed data indicates an approaching object (real or simulated), the vehicle may respond with appropriate braking and/or steering activities.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle test apparatus comprising:
a processor programmed to (i) transform data defining, for each of a plurality of instants of a duration of time for a vehicle to traverse a real or simulated route, a scheduled position of an object relative to a frame of reference local to a scheduled location along the route at the instant to data defining an actual temporal position of the object relative to a frame of reference local to the vehicle based on data defining a temporal location of the vehicle along the route at the instant and data defining the scheduled location along the route at the instant such that, for each of the plurality of instants, the scheduled position of the object and actual temporal position of the object are same relative to a global frame of reference regardless of the scheduled location along the route at the instant and the temporal location of the vehicle along the route at the instant, and (ii) output to the vehicle the data defining, for each of the plurality of instants, the actual temporal position of the object such that the vehicle executes control operations responsive thereto.

2. The vehicle test apparatus of claim 1, wherein the processor is further programmed to record data corresponding to the scheduled position of the object based on output from one or more vehicle sensors, and corresponding to a location or motion of the vehicle in an external reference frame based on a vehicle speed signal or a GPS signal.

3. The vehicle test apparatus of claim 1, wherein the processor is further programmed to (a) transform data defining, for each of the plurality of instants, a scheduled velocity of the object relative to the frame of reference local to the scheduled location at the instant to data defining an actual temporal velocity of the object relative to the frame of reference local to the vehicle based on the data defining the temporal location of the vehicle along the route at the instant, data defining a temporal heading of the vehicle along the route at the instant, the data defining the scheduled location along the route at the instant, and data defining a scheduled heading along the route at the instant such that, for each of the plurality of instants, the scheduled velocity of the object and actual temporal velocity of the object are same relative to a global frame of reference regardless of the scheduled location and heading along the route at the instant and the temporal location and heading of the vehicle along the route at the instant, and (b) output to the vehicle the data defining, for each of the plurality of instants, the actual temporal velocity of the object such that the vehicle executes control operations responsive thereto.

4. The vehicle test apparatus of claim 1, wherein the scheduled positions and scheduled locations are defined by sensor data collected during an on-road drive cycle.

5. The vehicle test apparatus of claim 1, wherein the vehicle is operatively arranged with a dynamometer and the frame of reference local to the vehicle is defined by speed data from the dynamometer or vehicle.

6. A test method for a vehicle comprising:
transforming data defining scheduled positions of an object relative to a frame of reference local to scheduled locations along a real or simulated route to data defining actual temporal positions of the object relative to a frame of reference local to the vehicle based on data defining temporal locations of the vehicle along the route and data defining the scheduled locations along the route such that the scheduled positions of the object and actual temporal positions of the object that temporally correspond are same relative to a global frame of reference regardless of the scheduled locations along the route and the temporal locations of the vehicle along the route; and
outputting to the vehicle the data defining the actual temporal positions of the object such that the vehicle executes control operations responsive thereto.

7. The test method of claim 6 further comprising (a) transforming data defining scheduled velocities of the object relative to the frame of reference local to the scheduled locations to data defining actual temporal velocities of the object relative to the frame of reference local to the vehicle based on the data defining the temporal locations of the vehicle along the route, data defining temporal headings of the vehicle along the route, the data defining the scheduled locations along the route, and data defining scheduled headings along the route such that pairs of the scheduled velocities of the object and actual temporal velocities of the object that temporally correspond are same relative to a global frame of reference regardless of the scheduled locations and headings along the route and the temporal locations and headings along the route, and (b) outputting to the vehicle the data defining the actual temporal velocities of the object such that the vehicle executes control operations responsive thereto.

8. The test method of claim 6 further comprising collecting during an on-road drive cycle sensor data defining the scheduled positions and scheduled locations.

9. The test method of claim 6, wherein the vehicle is operatively arranged with a dynamometer and the frame of reference local to the vehicle is defined by speed data from the dynamometer or vehicle.

* * * * *